Feb. 28, 1956     H. B. CLIFFORD     2,736,456
SHUTTER FOR EGG CARRIER
Filed June 25, 1954
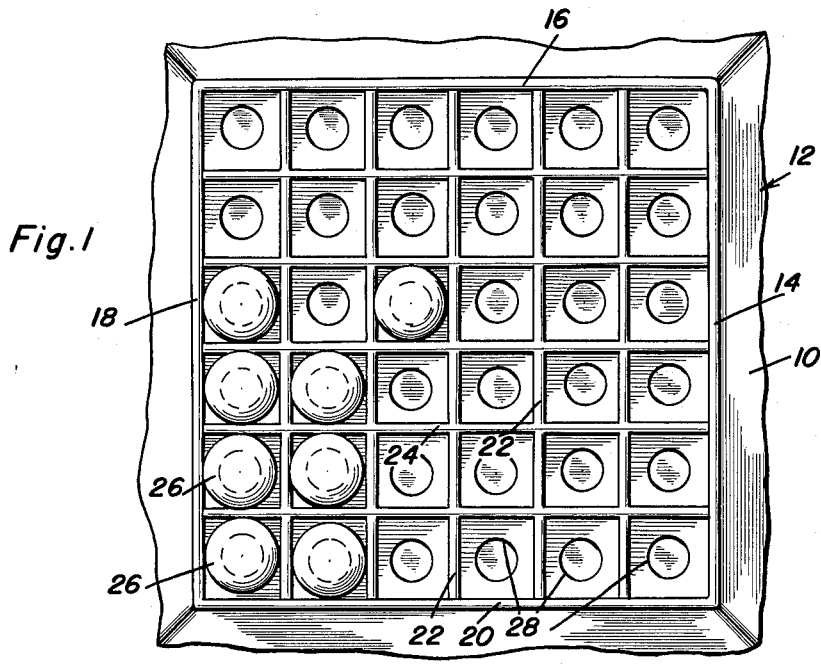
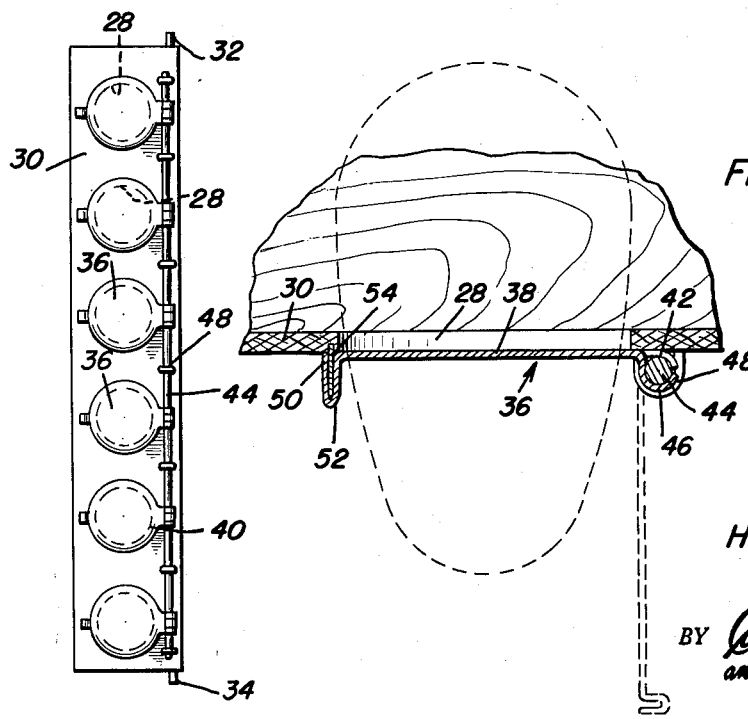
Hilda B. Clifford
INVENTOR.

United States Patent Office 2,736,456
Patented Feb. 28, 1956

2,736,456

SHUTTER FOR EGG CARRIER

Hilda B. Clifford, Eckelson, N. Dak.

Application June 25, 1954, Serial No. 439,311

1 Claim. (Cl. 220—31)

This invention relates generally to egg carriers and pertains more particularly to improvements in the shutters therefor.

A primary object of this invention is to provide an improved shutter mechanism for egg carriers which forms the bottom wall of the egg carrier compartments and which will permit the carrier to be utilized for candling purposes either partially or completely filled with eggs to be candled, the shutters being so constructed as to permit light to pass therethrough only when an egg is disposed in an associated compartment.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the improved carrier assembly;

Figure 2 is an enlarged transverse section taken through one of the shutter mechanisms; and Figure 3 is a bottom plan view of one of the improved shutters.

Referring now more particularly to the drawings, reference numeral 10 indicates the upper or open portion of a candling machine, the details of which form no part of this invention but within which it is to be understood that the egg carrier assembly indicated generally by the reference character 12 is adapted to be disposed. It is to be understood that the candling machine incorporates a strong light in the interior thereof that is adapted to pass outwardly thereof through the opening into which the carrier 12 is disposed such that the eggs in the carrier may be rapidly and easily candled.

Normally, carriers utilized for candling purposes include an outer frame having side wall members 14, 16, 18 and 20 and are suitably subdivided into egg receiving compartments by the intersecting cross partition members 22 and 24, respectively. In Figure 1, several eggs 26 are shown disposed in some of the compartments formed by the cross pieces 22 and 24. It is also conventional to provide bottom wall members for the compartments in the form of shutters which are hingedly secured individually to the under-surface of the main frame of the carrier and suitable control means may be provided for the shutters to selectively hold them in open or bottom wall forming position such that after the eggs are candled they may be simultaneously and rapidly released into an egg carton. Further, it is conventional to provide these shutters with openings 28 which are smaller in diameter than the eggs disposed in the compartments and which form a seat for the eggs disposed therein such that the light may pass through the eggs and be visually inspected or candled. The only difficulty with this particular arrangement is that when the carrier 12 is only partially filled with eggs, the amount of light passing unobstructed through the openings 28 in the carrier shutters is blinding to the operator and it is difficult to properly candle the eggs that are disposed in the compartments.

For the purpose of obviating this effect, it will be seen that conventional shutters 30 are proposed which incorporate hinge pins 32 and 34 for pivotal connection to the undersurface of the carrier 12 but which are provided with a plurality of closure members 36 adapted to selectively block off the openings 28 in accordance with whether or not an egg is disposed in an associated compartment. In this respect, it will be appreciated that each member 36 is provided with a main body portion 38 which is flat and relatively thin and which is provided at one side with a radially projecting ear 40 having a center portion 42 slightly deformed to wrap partially around a pivot rod 44 and having end or outer portions 46 adapted to partially embrace the opposite side of the hinge pin 44 whereby the members 36 are hingedly secured to the pin 44. The pin 44 may be suitably secured to the undersurface of the individual shutters 30 by means of struck out tab portions 48 of the shutter through which the pin is passed and rigidly held thereby. At the side opposite from the ears 40 the members 36 are provided with generally U-shaped portions 50 shaped from radially projecting ears on the main body portion and bent in a manner shown most clearly in Figure 2 such that the bight 52 extends to a point below the portions 46 and 48.

The U-shaped portion 50 on the elements 36 form clamping jaws which are adapted to frictionally engage with depending latch ears 54 secured to the undersurface of the shutters 30 adjacent an edge of the openings 28 therein and the principle of operation is such that sufficient frictional engagement is obtained between the clamp members 50 and the latch portions 54 that the elements 36 are normally held in the full line position as shown in Figure 2. However, once an egg is disposed in an associated compartment, the pressure thereof or weight thereof against the elements 36 will disengage the clamp portions 50 from the ears 54 such that the elements will assume the dotted line position shown in Figure 2. In this manner, only those openings in the shutters which are provided with an egg in their associated compartments will be opened to permit light to pass therethrough for candling of the eggs. In this manner, no light can pass through the empty compartments and blind or otherwise annoy the operator. Before the eggs are placed in the carrier, the carrier is moved downwardly and horizontally to rock the clamp portions against a flat surface so that all of its closure elements 36 will be swung upwardly into closing position and in this respect it will be noted that this is permitted by virtue of the fact that the bight portion 52 extends a substantial distance below any other element or part on the bottom of the shutters even when in the closed position as shown in Figure 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In an egg carrier, an elongated bottom shutter member having a plurality of openings therein, a pintle pin secured to said shutter member adjacent said openings, a plurality of closure plates hingedly secured to said pintle pin for swinging upwardly to underlie and close the openings and gravity actuated to swing downwardly to open said openings, a latching tongue secured to and depending from said shutter adjacent each of its openings, and an upwardly opening U-shaped clamp member on each of said closure plates adapted to frictionally engage an associated tongue and maintain the plates in closed position when said closure plates are swung upwardly.

References Cited in the file of this patent

UNITED STATES PATENTS

| | | |
|---|---|---|
| 431,591 | Juergens | July 8, 1890 |
| 1,141,062 | Johnson et al. | May 25, 1915 |
| 1,174,303 | Bailey | Mar. 7, 1916 |
| 1,472,673 | Reagan | Oct. 30, 1923 |
| 2,564,298 | Costello | Aug. 14, 1951 |
| 2,677,569 | Clifford | May 4, 1954 |